United States Patent [19]

Kuechler et al.

[11] Patent Number: 4,811,199
[45] Date of Patent: Mar. 7, 1989

[54] SYSTEM FOR STORING AND MANIPULATING INFORMATION IN AN INFORMATION BASE

[76] Inventors: William L. Kuechler, No. 3 Rum Row, Hilton Head, S.C. 29928; David W. Kuechler, 1618 Beacon Ridge Rd., No. 605, Charlotte, N.C. 28210

[21] Appl. No.: 47,703

[22] Filed: May 8, 1987

[51] Int. Cl.[4] .................................................. G06F 1/00
[52] U.S. Cl. ...................................... 364/200; 364/300
[58] Field of Search ........................ 364/200, 300, 900

[56] References Cited

U.S. PATENT DOCUMENTS

| 4,012,720 | 3/1977 | Call et al. ............................ 364/200 |
| 4,267,568 | 5/1981 | Dechant et al. ..................... 364/200 |
| 4,270,182 | 5/1981 | Asija ................................... 364/900 |
| 4,587,670 | 5/1986 | Levinson et al. ...................... 381/43 |

OTHER PUBLICATIONS

"A Bit-Mapped Classifier", pp. 161-172, *Byte*, by Frey (Nov. 1986).
"Finding Rules in Data", pp. 149-158, *Byte*, by Thompson and Thompson (Nov. 1986).
"Predicting International Events", pp. 177-190, *Byte*, by Schrodt (Nov. 1986).
"Retrieval on Secondary Keys", pp. 551-567, *The Art of Computer Programming*, vol. 3, Sorting and Searching, by Knuth (1973).

*Primary Examiner*—Raulfe B. Zache
*Attorney, Agent, or Firm*—Bell, Seltzer, Park & Gibson

[57] ABSTRACT

The present invention provides a system for the input, retrieval, manipulation and analysis of stored information in an information base. The system comprises an input device, a storage device, and an output device each capable of handling information elements. Each of the attributes of the information elements is processed to produce a compact symbol or code corresponding to predefined ranges of values of an attribute. These codes are then stored in correspondence with the information elements which gave rise to them. The result of this processing is a topological map of the attributes of the information elements. These topological maps may be retrieved and later processed to efficiently retrieve stored information elements, given any general unpreprogrammed query as input to the system. These topological maps may also be utilized in a process to determine correlations among the various attributes of the information elements.

28 Claims, 1 Drawing Sheet

SYSTEM FOR STORING AND MANIPULATING INFORMATION IN AN INFORMATION BASE

MICROFICHE APPENDIX

A microfiche appendix consisting of one fiche of 67 frames is included as part of this specification. This appendix contains a source code listing of a computer program which implements a working embodiment of the invention disclosed herein.

FIELD OF THE INVENTION

This invention relates to the efficient retrieval, manipulation, and analysis of stored information in an information base.

BACKGROUND OF THE INVENTION

It is frequently desirable to retrieve information elements stored in an information base on the basis of queries—for example a search for all information elements in the information base that have certain values of certain fields or attributes. Data processing systems typically require the query specification to employ exact values in order to retrieve the desired information from the information base. Thus, mathematically exact values of particular attributes (fields) are input, which are then compared with corresponding attribute (field) values of the information elements in the information base to select those elements with exactly equivalent values. This is also true of data manipulations, such as sorting, where it is desired to output information elements based on an ordering rule of one or more attributes (first, the record with the highest attribute value, then the next highest and so on). Such selective access permits the system to abstract the information base and deal only with the elements which are pertinent to the specifications of the query.

Methods currently used to handle such selective query specifications fall into two broad classes. The first is an exhaustive iterative examination of each of the elements of the information base to find those meeting the specifications of the query. The second is to store, for all elements, duplicate values of selected attributes (associated with a corresponding element address) in a specialized data structure (index) designed for rapid access to values and corresponding information elements meeting the specification. Examples of such specialized data structures include ordered lists, trees, hashed indexes and a number of other variations, of which, only a few are commercially viable.

Where applicable, such data structures or indexes provide much faster access than iterative search methods but are subject to the following limitations:

(1) The index files needed for reference to the attribute or attributes of the information base may be of substantial size, especially when the information element contains a large number of attributes which are indexed for subsequent retrieval. In some instances the storage requirements for the index files may equal or exceed the storage requirements for the information base itself.

(2) Indexes provide efficient access only for the specific attribute or combination of attributes for which the index is designed. They are inefficient or inapplicable for the flexible inquiries encountered in commercial practice which include a broad range of logical relations between varied combinations of numerous attributes, often on the basis of partial or inexact specifications.

Thus, while these methods satisfy the minimal requirements of data processing systems, they are far from adequate for the increasingly critical need for a general approach to efficient processing of complex multi-attribute specifications.

It should be noted that there are specialized examples of current methods which superficially deal with inexact specifications, such as partial key access, occasional use of explicit ranges and some recent systems which purport to permit the use of "plain english" specifications. However, such systems are still dependent on the ability of the logic of the system to translate or cross-relate such input to an exact key structure. Thus, partial keys will locate a record in a tree index (after operator inspection of a number of incorrect records) only if the initial characters of the partial input exactly match the initial characters of the complete key. Equivalent limitations apply to all other such methods and performance becomes less efficient and more inaccurate as the specifications become less precise. This is also true of recent developments in "artificial intelligence" systems, which employ very complex (and thus computationally bound) analytical logic, rule logic, classifier logic and so on to translate incomplete and imprecise input into the most specific and highest probability output possible, generally incorporating prompts for additional input to clarify ambiguities. Conversely, there is no general approach in the prior art which purposefully utilizes less precise representations of data to enhance the efficiency and validity of manipulating exact data values. It is an object of this invention to provide such generalized systems.

SUMMARY OF THE INVENTION

The present invention provides methods and means for manipulating information in a stored information base predicated on the unique compactness and ease of processing of coded maps of the attributes of an information base, referred to herein as topological maps. Each map comprises compact symbols corresponding to predefined ranges of values of an attribute. A symbol for the range encompassing the value of that attribute for each information element is stored in said map in correspondence to each element. The information elements, as well as the topological maps, are stored in an information storage device.

A query is processed by accessing the pertinent topological map or maps based upon the specifications of the query, and identifying from the map or maps, the information elements in the information base which meet the specifications of the query. Simple queries concerning a single attribute are resolved by accessing the pertinent topological map for that attribute, while more complex queries involving multiple attributes are resolved by combining the topological maps for the attributes involved in the query in accordance with the logical operators of the query.

The attribute value or range of values in the specifications of the query is compared to the predefined ranges represented by the symbols in the topological map for that attribute. Then, by referring solely to the map, it is possible to quickly eliminate from consideration those information elements of the information base which, as shown by their range symbols in the topological map, could not possibly meet the specifications of the query since the mapped range for that attribute value is clearly outside the value or range of values in the specification. In a like manner, it is possible to quickly identify information elements in the information base which are known with certainty to meet the specifications of the query because the mapped range for that attribute value is wholly within the range specified in the query. Because the symbols used in the map represent ranges of values rather than exact values, the resolution of the query may find some information elements which "may" meet the specifications of the query but which cannot be determined with certainty solely by reference to the map. Only those information elements which "may" meet the specifications of the query need be inspected to determine whether they meet the specifications of the query.

In addition to efficient manipulation of exact values, this approach can concurrently manipulate and correlate approximate or qualitative values with equal effectiveness and efficiency. Thus, an attribute corresponding to colors of clothing might have ranges defined as yellows, greens, blues, browns, reds, etc. Any variations in colors or terminology derived from one of these basic colors would be coded as belonging to that color range (tan to brown, rose to red and so on). Typical records in a clothing store data base would contain the garment type, color, style, brand and so on in addition to quantitative data such as cost, price, number on hand, sales, etc. The present invention will coherently manipulate both types of data, accurately answering queries such as "what are the relative sales of tall and short sizes of women's dresses in red and black colors for the fall and summer seasons of the past three years".

Such extensive specifications can be processed by general purpose computers with complete accuracy and specificity at rates which are orders of magnitude faster than prior art because the compactness of such coded topological maps permits a large number of attributes to be mapped with less storage than is required for prior art key structures with only one or two keys. Thus, all maps pertinent to an inquiry can be rapidly loaded into high speed semiconductor memory simultaneously and the processor not only has much less key data to evaluate, but can compare the compact codes with simple, high speed logic and can access this key data at semiconductor speeds, which are orders of magnitude faster than disk input-output transfer rates. These increases in rate of processing are compounding rather than additive and the net improvement is thus much greater than the sum of these effects.

The use of value ranges to characterize elements of the information base may, at a glance, appear to significantly reduce the specificity and thus the efficiency of the system. However, for inquiries relating to two or more ranges and attributes, which includes the vast majority of inquiries, the number of uncertain elements is insignificant. Such uncertainty as may be introduced by this approach is readily eliminated by directly checking uncertain records, which are identified in the normal course of processing the maps. Thus, any reduction in efficiency which may be introduced by such checking is minor or insignificant relative to the enormous improvement in the speed of isolating the records initially.

For direct access to specific records via primary keys, the present invention offers no significant improvement in speed relative to the prior art, since speed of current techniques is already at the limits of human perception. However, this invention still offers major improvements in terms of reduced storage space for direct key files, and can offer major improvements in speed where direct access by a variety of secondary keys is required. This again relates to the feasibility of storing the complete compact code maps in high speed memory.

A few prior art techniques have been disclosed which have a superficial resemblance to elements of this invention. These are exemplified by the section entitled "Retrieval on Secondary Keys" in Volume 3/Sorting and Searching/The Art of Computer Programming by Donald E. Knuth, who is widely recognized as one of the leading authorities in this field. Both the preamble and summary of this section point out the difficulty and major limitations of the current art in coping with complex, multi-attribute queries and define the examples included as highly specialized techniques of narrow utility.

Knuth provides an example on page 554 of an "orthogonal range query" (two perpendicular dimensions). He proposes partitioning the two dimensions into ranges, but only for the limited purpose of defining a combined class which is equivalent to the product of the two dimensions (i.e. area or domain). He then proposes forming an inverted list of record numbers corresponding to these product classes, each corresponding list including any records whose dimensions would be encompassed by the product class. Knuth finally proposes processing this list for all product classes which may encompass any set of values of both dimensions which are included in a specification defining upper and lower limits for each dimension (i.e. areas within the domain). This isolates all records which fall within the specified ranges, but also includes many records which satisfy one of the two range specifications but not both. Because the ranges of Knuth's method depend on two attributes, the lack of specificity for each range/product class is compounded. For example, if the values satisfying a query were included in a set of elements falling between the midpoints of two adjacent ranges for each of the two dimensions, both Knuth's proposal and the present invention would be 25 percent efficient (i.e., 1 value out of 4 selected would actually meet the specification). However, if the number of ranges were doubled for both methods, every selection by the present invention would meet the specification (i.e., 100 percent efficiency), while Knuth's proposal would still produce 1 invalid record for each correct one (i.e., 50 percent efficiency). Hence, additional complex processing is necessary to discard these irrelevant records.

Although this approach emulates a few of the functions of the present invention for limited and specialized information retrieval requirements, the structure proposed by Knuth is inherently multidimensional; queries referencing only one of the attributes described by this multidimensional structure radically reduce the efficiency of utilizing this structure to find records satisfying the query. Thus, a dominant distinction is that Knuth's proposal (as he points out) cannot be straightforwardly extended to efficient interaction with other such lists to satisfy the general case of queries where the combinations of attributes referenced in the query are determined dynamically and not known a priori. Conversely, the ability to define correspondences in the form of "topological maps" which may be rapidly searched and which are compatible with the concurrent processing of any number of dimensions or types of information is an important feature of this invention. A considerable number of additional distinctions will be apparent from the detailed specifications, but the above is clearly sufficient to distinguish this invention from the prior art.

It will be evident to those skilled in the art that the scope of this invention encompasses numerous variations and that references to specific preferred embodiments are illustrative and not limiting. Thus, means incorporating parallel processors, dedicated logic processors, optical devices and so on and methods utilizing inverted maps, dual cross-coded maps and so on, separately or in combinations will be seen as synergistic embodiments which are clearly within the spirit of this invention.

DESCRIPTION OF THE DRAWINGS

Further features and aspects of the invention will become apparent from the detailed description and illustrative example which follow, and from the accompanying drawings, in which.

DESCRIPTION OF ILLUSTRATIVE EMBODIMENT

Figures 1, 2:
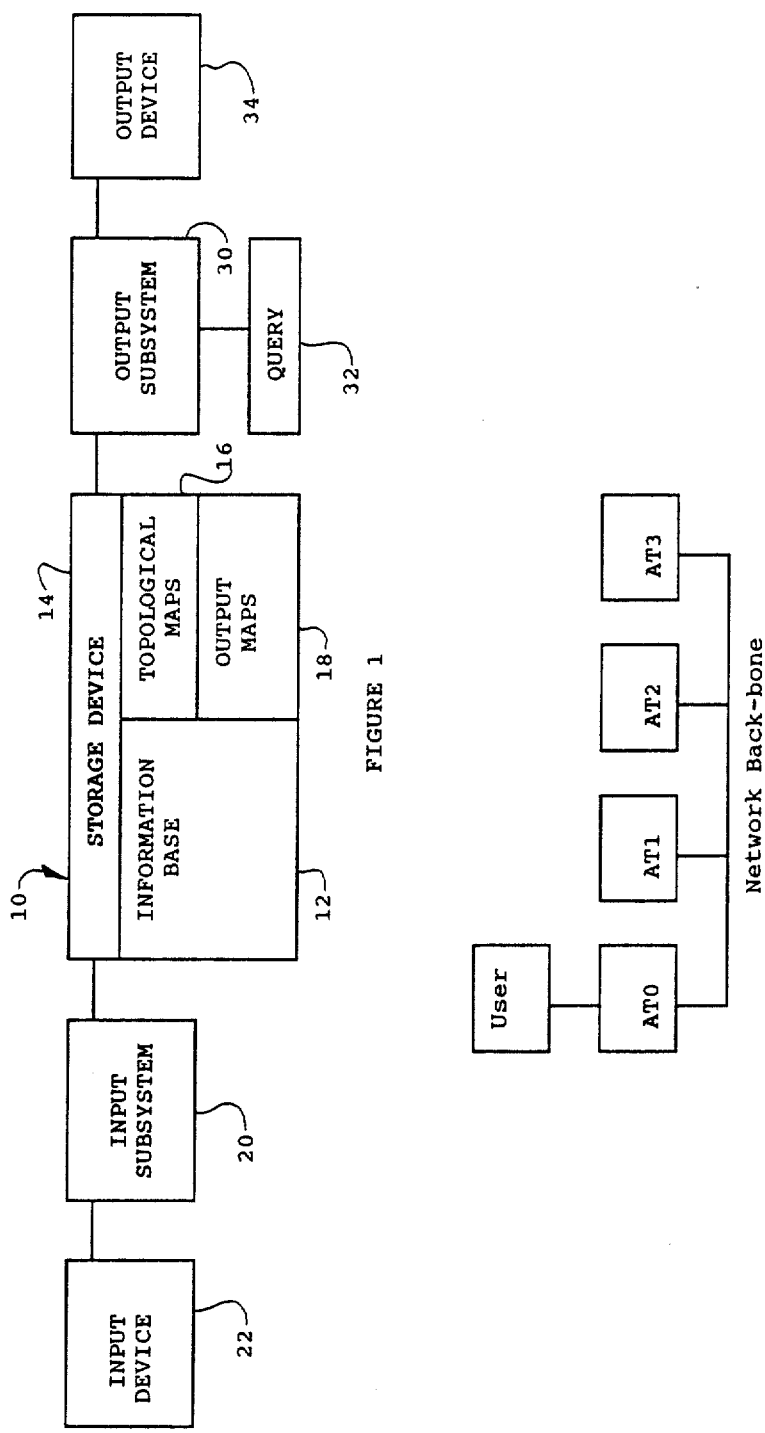
FIG. 1 is a block schematic representation illustrating the primary elements of the system of the present invention.
FIG. 2 is a block schematic representation illustrating an arrangement of microcomputers suitable for implementation of the present invention in a parallel processing environment.

The present invention is essentially a contextual reference information retrieval system. Given any reference to information by content of the information, this system efficiently retrieves information matching the specification.

As illustrated schematically in FIG. 1, the system, generally indicated by the reference character 10, is used to access and manipulate an information base 12 which is stored in a storage device 14. The information base 12 is comprised of one or more information elements. Each information element is comprised of one or more attributes (or fields), one or more of these attributes having an orderable value. By "orderable value" is meant that the attribute of the element has a value capable of being evaluated and being placed in some order in relation to the value of that attribute for other elements in the information base. This may include numbers, characters of the alphabet, symbols, codes, etc. The system 10 consists of two subsystems: an input subsystem 20, and an output subsystem 30.

The input subsystem accepts input from an input device 22. The input device 22 is capable of receiving information base elements where an information base element is comprised of one or more attributes and the corresponding values for these attributes. The input subsystem 10 is used to process the individual information elements as they are input to the information base, or as changes or deletions are made and to produce processed representations or "topological maps" 16 of the attributes of the information base elements. The topological maps 16 are stored in the storage device 14 for subsequent use by the output subsystem 30.

The output subsystem 30 is given a query 32 as input, i.e., a reference to the information on the basis of a specification of the values of one or more attributes. The query 32 may be entered into the output subsystem 30 by any suitable input device, and may for example, utilize the same input device 22 as is employed by the input subsystem 20. The output subsystem 30 then utilizes the storage device 14 to retrieve the topological maps 16 of the attributes referenced by the specification. These topological maps are then manipulated in accord with the query, the end result being one or more output maps 18 indicating information elements which either:

(1) *Do* meet the specification, or
(2) *May* meet the specification, or
(3) *Do not* meet the specification.

The output map thus defines a "superset" of the information elements in the information base which meet the specification of the query. It is a superset because some of the elements "may" satisfy the query.

The output map which is generated indicates which of the elements in the superset *do* meet the specification of the query and which of those elements *may* meet the specification. Those elements which the map indicates *do* meet the specification are known with certainty without ever having accessed or inspected the stored information elements themselves. Now, only those elements which the output map indicates *may* meet the specification are accessed and inspected to determine which ones *do* meet the specification. The results of the query are communicated to the user by an output device 34. As will become apparent from the illustrative example which follows, the output subsystem is capable of rapidly resolving various kinds of queries, including queries as to exact values of certain attributes, range queries, and complex queries about multiple attributes using Boolean logic.

The specific configuration of the storage device 14 is not critical, and may take various forms depending on how the present invention is implemented. In a microcomputer implementation, for example, it is desirable that at least a portion of the data storage device comprise high speed random access memory, such as semiconductor memory for example. The topological maps would be loaded into the high speed random access memory during resolution of a query to facilitate manipulation and processing of the maps. Additional data storage —e.g. for permanent storage of the information elements of the information base and topological maps—can be handled by other suitable data storage means such as magnetic media, bubble memory devices, optical (laser) memory devices, etc.

For illustrative purposes, we will consider an example of applying this technique to an information base composed of elements represented by fixed length ASCII records. Each element in the information base is comprised of attributes; each attribute type can be either "Alpha", meaning that it can store characters or digits, or "Integer" meaning that it can store an integer value (represented as an ASCII string of digits). The attribute list for the elements of this information base is shown below:

| Attribute Name | Type | Length |
|---|---|---|
| NAME | Alpha | 10 |
| SALARY | Integer | 4 |
| JOB-ID | Integer | 4 |

The contents of this sample information base are:

Record
Numbers
|
v

-continued

|     | NAME    | SALARY | JOB-ID |
|-----|---------|--------|--------|
| 0   | Bob     | 7500   | 5371   |
| 1   | Joe     | 6150   | 3475   |
| 2   | Jim     | 1900   | 7249   |
| 3   | Bill    | 4300   | 1537   |
| 4   | Ridge   | 6300   | 6492   |
| 5   | Jeff    | 8900   | 894    |
| ... | ...     | ...    | ...    |
| 100 | Kim     | 2400   | 1564   |
| 101 | Beverly | 3700   | 2198   |
| 102 | Jane    | 5350   | 3642   |
| 103 |         |        |        |

Thus, the information base contains 103 records (since we started numbering with 0), and slot 103 is currently the End of File for this information base.

Using the above as the information base, a description of the process is given below.

Input Subsystem (a) Range Definition

Before the topological maps may be created, a range definition must be created for each attribute. The range definition comprises one or more unique ranges of values for the attribute, i.e., a lower bound and upper bound for this attribute. Collectively all the ranges which make up the range definition for the attribute must include all possible values of this attribute for all elements in the information base, i.e., for every possible attribute value there must be at least one range which includes that value. One way to determine such a range definition is to arbitrarily define these ranges. An example of a "range definition" is:

| Range Number | >     | <=    |
|--------------|-------|-------|
| 0            | $-\infty$ | 300   |
| 1            | 300   | 700   |
| 2            | 4000  | 7372  |
| 3            | 5700  | 9300  |
| 4            | 700   | 4000  |
| 5            | 7372  | $+\infty$ |

An information element is said "to map" to a particular range of an attribute if the value of the attribute for that information element is included in said range. The attribute value is also said to map to that range.

Some examples of values and the range(s) to which they map for this definition are:

| Value | Range Number(s) |
|-------|------------------|
| 4563  | 2                |
| 5900  | 2,3              |
| 12    | 0                |
| 479   | 1                |

Although the ranges may be constructed to overlap, as shown above, advantageously, these ranges are constructed to be mutually exclusive so that any given value of an attribute maps to exactly one range in the range definition. Additionally, it is in general advantageous to have approximately equal number of information elements map to each range of an attribute. This can be done by taking a sample of the information elements in the information base and selecting a range definition such that an equal number of the information elements in the sample map to each range, i.e., the range definition "equi-partitions" the sample. Assuming the size of the sample was large enough to be statistically significant, this range definition will also serve to approximately equi-partition the information base as a whole.

Additionally, a unique code/representation is associated with each of the ranges for an attribute. Thus, if a range definition with 250 ranges were created, the range including the lowest attribute values would be assigned a 0, the next lowest range a 1, and so on up to 249 for the highest range.

This advantageous range definition for an attribute can be effected by this method:

(a) Determine the number of ranges to be in the range definition, NUM-RANGES. (A typical value of NUM-RANGES is 250.)

(b) Take (NUM-RANGES * SAMPLES-PER-RANGE) samples from the information base, and array, the SAMPLE-ARRAY. (A typical value of SAMPLES-PER-RANGE is 30.)

(c) Sort the entries in SAMPLE-ARRAY into ascending order (based on the ordering rule appropriate for this type of attribute).

(d) Then every SAMPLES-PER-RANGE'th entry is selected from SAMPLE-ARRAY to serve as the upper-bound for a range (the lower bound being defined by the previous upper bound). This result is stored in RANGE-DEF-ARRAY. Finally, the last value stored in RANGE-DEF-ARRAY is the highest value possible for this attribute.

To take a specific example, consider the case of our information base described above. Assume that we wish to create a range definition for SALARY, NUM-RANGES=8, and SAMPLES-PER-RANGE=5. Thus, we must take (NUM-RANGES * SAMPLES-PER-RANGE)=(8 * 5)=40 samples from the information base transferring the value of SALARY from the information base element selected to an entry in the SAMPLE-ARRAY. Graphically, the sampling operation can be seen as:

|     | NAME    | SALARY | JOB-ID |     | SAMPLE-ARRAY |
|-----|---------|--------|--------|-----|--------------|
| 0   | Bob     | 7500   | 5371   | 0   | 3475         |
| 1   | Joe     | 6150   | 3475   | 1   | 6492         |
| 2   | Jim     | 1900   | 7249   |     | ...          |
| 3   | Bill    | 4300   | 1537   | 39  | 2198         |
| 4   | Ridge   | 6300   | 6492   |     |              |
| 5   | Jeff    | 8900   | 894    |     |              |
| ... | ...     | ...    | ...    |     |              |
| 100 | Kim     | 2400   | 1564   |     |              |
| 101 | Beverly | 3700   | 2198   |     |              |
| 102 | Jane    | 5350   | 3642   |     |              |
| 103 |         |        |        |     |              |

Now that we have SAMPLE-ARRAY filled with sample values, the array is sorted in ascending order. Once it is sorted, every SAMPLE-PER-RANGE'th value of the sorted SAMPLE-ARRAY is used as the upper bound for a range. Graphically, this process can be seen as:

| SAMPLE-ARRAY | | RANGE-DEF-ARRAY | |
|---|---|---|---|
| | ⋮ | | ⋮ |
| 19 | 5100 | 3 | 5100 |
| 20 | 5300 | 4 | 6130 |
| 21 | 5475 | 5 | 6940 |
| 22 | 5920 | | ⋮ |
| 23 | 6050 | | |
| 24 | 6130 | | |
| 25 | 6492 | | |
| 26 | 6720 | | |
| 27 | 6815 | | |
| 28 | 6870 | | |
| 29 | 6940 | | |

The end result of this process is that RANGE-DEF-ARRAY looks like this:

| | |
|---|---|
| 0 | 1380 |
| 1 | 2970 |
| 2 | 4450 |
| 3 | 5100 |
| 4 | 6130 |
| 5 | 6940 |
| 6 | 8570 |
| 7 | 9280 |
| 8 | ∞ |

Input Operation

The input procedure comprises the following processing steps:

(A) Inputting one or more information elements each of which has one or more attributes, each attribute having a value.

(B) For each attribute element
  (1) For each information element
    (a) Determine the range to which the attribute maps using the range definition defined for this attribute.
    (b) Store the code representing the range to which this attribute value mapped in a location in this attribute's topological map which corresponds to this information element's record number.

To determine the range to which a value VALUE maps, the following algorithm is applied:

(a) FOR i := 0 TO NUM-RANGES
  (1) IF RANGE-DEF-ARRAY[i] >= VALUE GOTO EXIT
(b) EXIT: RETURN(i);

So, i is incremented until we find a boundary value which is greater than or equal to the value. At this point, the index into the RANGE-DEF-ARRAY is the range number for this value of this attribute.

Graphically, this process can be seen as:

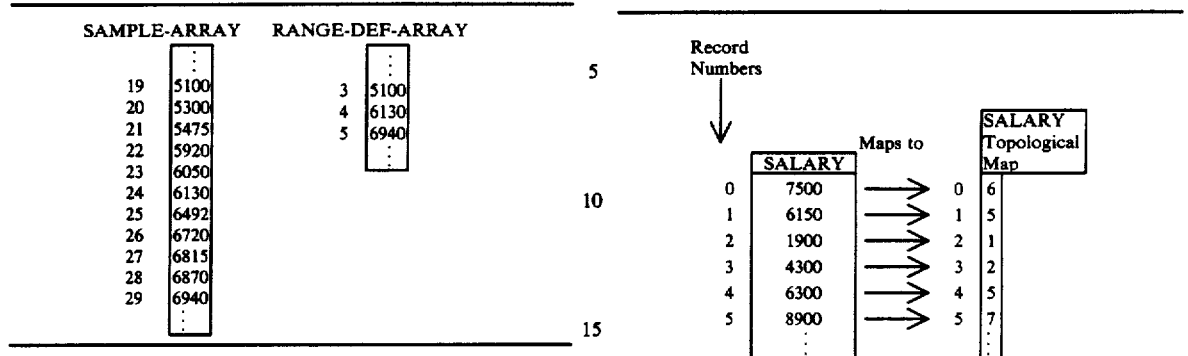

The information base has been stripped in the above illustration to show just the SALARY attribute, as this is the attribute which we are concerned with inputting. The method described above is used for each value to determine the range to which it maps. The corresponding range number for the range to which the value maps is then stored in the SALARY topological map in correspondence with the record which gave rise to it. In this case, the correspondence is kept by using the record number for each information base element as the offset into the topological map in which to store the range number for the information element.

For further illustration, consider a new element to be added to the information base:

| NAME | SALARY | JOB-ID |
|---|---|---|
| Jo Jo | 2200 | 8391 |

This record is stored at the end of file (EOF):

| | NAME | SALARY | JOB-ID |
|---|---|---|---|
| | ⋮ | | |
| 100 | Kim | 2400 | 1564 |
| 101 | Beverly | 3700 | 2198 |
| 102 | Jane | 5350 | 3642 |
| 103 | Jo Jo | 2200 | 8391 |
| 104 | | | |

A new topological map entry is made as follows:

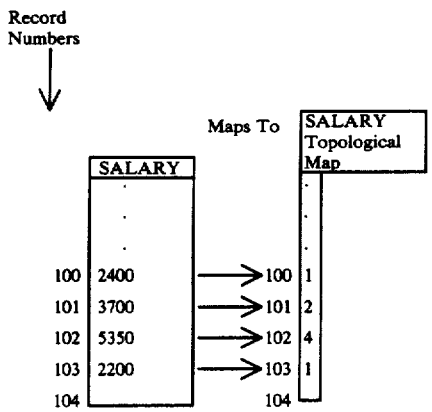

One optimization which can be important to the method functioning efficiently is the concept of a "correction map". If the above method is literally applied to an information base, then each time a new information base element is added or an attribute of an existing information element is changed, an update is required for each attribute's topological map. In the case of our example information base there are three attributes. Therefore, each record being added will require three accesses to update the topological maps. In the case of an information base wherein each element is described with 12 attributes (not uncommon), this would require 12 accesses being made per element added. For our example information base, if 100 elements were added to the information base, then (100 * 3)=300 accesses would be required.

However, we can define a correction map, where this "correction map" can store the range number for every attribute of an information element. Thus, when a new record is added, only one update need be made instead of three; this one update will be made to the correction map. The correction map entry will have the record number of the added information element along with the range number for each attribute. When the map for an attribute is retrieved, the correction map is also loaded, and each entry in the correction map is processed to update the memory image of the attribute map to get a 100% up-to-date map.

Later, all of the entries in the correction map may be processed together to update the topological map for each attribute. In the case of our example, since 100 elements have been added, and since they were all added at EOF, the elements of the topological map to be updated will all be located in the same physical block. Thus, we only require 1 access for each attribute, in which all 100 entries may be added to the topological map. The total number of accesses required for the "raw" application of the method was (100 * 3)=300 accesses. With this improvement, however, only (100 * 1)+(3 * 1)=103 accesses were required. We have thus reduced the storage device I/O requirements by about 3:1.

Output Subsystem Operation

One general form of query is called a Boolean query. It is defined to be one or more range queries joined by AND, OR, or NOT. A range query is query in the form:

($<$value$>$ $\leq$ attribute name$>$ $\leq$value$>$)

In the case of our example information base, a range query might be:

(3000$\leq$SALARY$\leq$4500)

This query means that we would like to retrieve all information base elements which have a value of the attribute SALARY which is between 3000 and 4500.

The output procedure consists of receiving a query as input, and then producing a superset of those records which meet the query specification. This production of a superset given a query is termed "resolving" the query.

The result describes for each information element in the information base one of three states of the element with respect to the query:

(a) NO.

This element does not meet the specification.

(b) YES.

This element does meet the specification.

(c) MAYBE.

This element may meet the specification. Due to quantization error with the ranges, we are not certain whether or not this information element meets the specification.

The method for resolving a range query utilizing the topological maps created by the input process will be shown first. Next, the resolution of a query which involves Boolean combination of range queries will be shown.

Range Query Resolution

Consider a query of the form:

($<$low-value$>$ $\leq$ $<$attribute$>$ $\leq$ $<$high-value$>$)

An example of this query is:

(4500$\leq$SALARY$\leq$6350)

For the following discussion, ACCEPTABLE is an array of integers which has one entry per range of the attribute. Each element in this array may have one of three values:

(a) NO_VALUE:

Indicates the elements having this range number would definitely not meet the range specification.

(b) YES_VALUE:

Indicates the elements having this range number would definitely meet the range specification.

(c) MAYBE_VALUE:

Indicates the elements having this range number may or may not meet the range specification.

The method for resolving this range query is: (NOTE: map(value) returns the range number of this value for an attribute).

(a) Generate ACCEPTABLE array. This allows the range query to be resolved for an information element by a straight look up in the ACCEPTABLE array given that element's range number.

(1) Set low-range=map(low-value).
(2) Set high-range=map(high-value).
(3) FOR i :=0 TO (low-range −1)
   (a) ACCEPTABLE[i]:=NO_VALUE.
(4)   ACCEPTABLE[low-range]:=MAYBE_VALUE.
(5) FOR i :=(low-range+1) TO (high-range−1)
   (a) ACCEPTABLE[i]:=YES_VALUE.
(6) ACCEPTABLE[HIGH-RANGE]:=MAYBE_VALUE.

(7) FOR i :=(high-range+1) TO MAX_RANGE_NO
   (a) ACCEPTABLE[i]:=NO_VALUE.
(b) Retrieve the topological map for this attribute, and store in TOPOLOGICAL-MAP. TOPOLOGICAL-MAP is an array of integers.
(c) Create a map, OUTPUT-MAP, which has one entry per entry in TOPOLOGICAL-MAP. OUTPUT-MAP is an array of integers.
(d) FOR i :=0 TO (NUM-ENTRIES-IN-MAP−1)
   (1) OUTPUT-MAP[i]:=

Every entry in OUTPUT-MAP now contains either NO_VALUE, or YES_VALUE, or MAYBE_VALUE, indicating whether or not the corresponding information base element does not meet the specification, does meet the specification, or may meet the specification, respectively.

Graphically, the creation of the ACCEPTABLE array for a query (such as 3300≦SALARY≦7300) can be seen as:

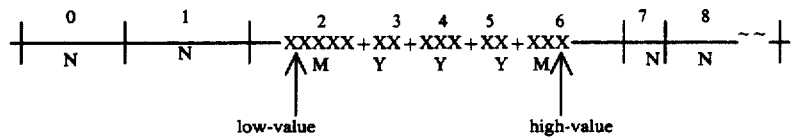

NOTE:
o X and +'s in between X's represent values of interest
o N: No.
Y: Yes
M: Maybe.

Thus, values mapping to range 0 or 1 are clearly not within the specification. Values mapping to Range 2 may be in the specification, as some values mapping to this range are within the range specification, and some values mapping to this range are outside of the range specification. Values mapping to ranges 3, 4, or 5 are within the specification. Values mapping to range 6 may or may or may not be in the range specification for the same reason given for range 2. Finally, values mapping to range 7 or 8, are not within the specification.

The creation of the OUTPUT-MAP can be seen as:

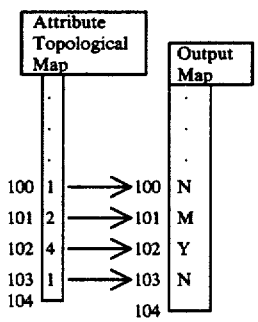

Boolean Query Resolution

In general, the range queries described above can be joined together with AND, OR, and NOT to create a more complex query. Examples are:

((3500≦SALARY≦5000) AND (2130≦JOB-CODE≦2240))

((7200≦SALARY≦7900) OR (4160≦JOB-CODE≦5000))

((7200≦SALARY≦7900) AND (NOT (4160≦JOB-CODE≦5000)))

The Range Query Resolution described above allows us to resolve the individual range queries, but the method for handling Boolean combinations of logic has not been disclosed. The Boolean combinations of range queries are handled by the following general method:

(a) Resolve each of the range queries in the Boolean query, placing the result in a different map (intermediate output map) for each range query.

(b) Logically combine the results (intermediate output maps) for the range queries according to the Boolean query.

The truth tables for each of the Boolean operators are given below:

AND

| A | B | A AND B |
|---|---|---------|
| N | N | N |
| N | M | N |
| N | Y | N |
| M | N | N |
| M | M | M |
| M | Y | M |
| Y | N | N |
| Y | M | M |
| Y | Y | Y |

This truth table should be fairly evident simply on common-sense application of the meanings of these terms in real life. E.g., N AND Y=N. If something should be both (a) and (b) and if it is (b) but is not (a), then (a) and (b) is not true. Another example: Y AND M=M. If something should be (a) and (b), and we know it is (a) and it may be (b) then it may satisfy (a) and (b).

OR

-continued

| A | B | A OR B |
|---|---|---|
| N | N | N |
| N | M | M |
| N | Y | Y |
| M | N | M |
| M | M | M |
| M | Y | Y |
| Y | N | Y |
| Y | M | Y |
| Y | Y | Y |

Again, this is fairly evident from common-sense application of the meanings of the terms.

NOT

| A | NOT A |
|---|---|
| N | Y |
| M | M |
| Y | N |

Consider the example of ($2000 \leq SALARY \leq 5250$). Then, the values of interest would be:

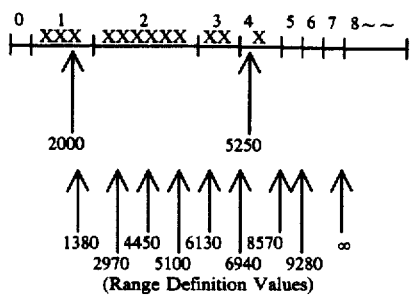

Then clearly, 0 is N, 1 is M, 2–3 is Y, 4 is M, and 5–8 is N. If we consider (NOT ($2000 \leq SALARY \leq 5250$)), then the values of interest are:

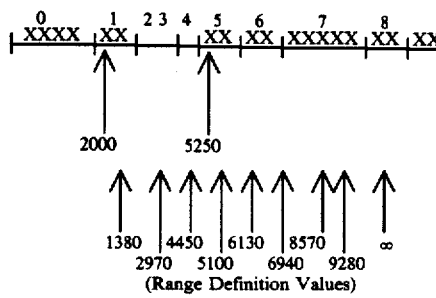

In this example, clearly range 0 is Y, 1 is M, 2–3 is N, 4 is M, and 5–8 is Y. Thus, the Y ranges turned to N ranges, the N ranges turned to Y ranges, and the M ranges stayed M.

Discussion and Examples

Thus, if we had a query of the form:

(RANGE-QUERY-1 AND RANGE-QUERY-2)

RANGE-QUERY-1 would be resolved, and the result placed in OUTPUT-MAP-1. RANGE-QUERY-2 would be resolved and placed in OUTPUT-MAP-2. Then, OUTPUT-MAP-1 would be AND'ed with OUTPUT-MAP-2 according to the truth table given above for AND to give an output map RESULT. RESULT indicates those information elements which do meet the specification, those which do not meet the specification, and those which may meet the specification.

Now, to consider a specific example, let's say we had a query:

(($3500 \leq SALARY \leq 5500$) OR
($1300 \leq JOB\text{-}ID \leq 2300$))

The range definition for SALARY given above and the acceptable array for this query looks like:

| SALARY Range Definition | | SALARY Acceptable Array | |
|---|---|---|---|
| 0 | 1380 | 0 | N |
| 1 | 2970 | 1 | N |
| 2 | 4450 | 2 | M |
| 3 | 5100 | 3 | Y |
| 4 | 6130 | 4 | M |
| 5 | 6940 | 5 | N |
| 6 | 8570 | 6 | N |
| 7 | 9280 | 7 | N |
| 8 | ∞ | 8 | N |

The range definition for JOB-ID (which was not specified previously in this example) looks like:

| JOB-ID Range Definition | | JOB-ID Acceptable Array | |
|---|---|---|---|
| 0 | 300 | 0 | N |
| 1 | 735 | 1 | N |
| 2 | 1750 | 2 | M |
| 3 | 2125 | 3 | Y |
| 4 | 2700 | 4 | M |
| 5 | 3400 | 5 | N |
| 6 | 4300 | 6 | N |
| 7 | 4750 | 7 | N |
| 8 | ∞ | 8 | N |

Considering the first portion of the information base, we have:

| | NAME | SALARY | JOB-ID |
|---|---|---|---|
| 0 | Bob | 7500 | 5371 |
| 1 | Joe | 6150 | 3475 |
| 2 | Jim | 1900 | 7249 |
| 3 | Bill | 4300 | 1537 |
| 4 | Ridge | 6300 | 6492 |
| 5 | Jeff | 8900 | 894 |

The topological maps and output maps for the SALARY and JOB-ID terms are:

| | SALARY<br>Topological<br>Map | | SALARY<br>Output<br>Map |
|---|---|---|---|
| 0 | 6 | 0 | N |
| 1 | 5 | 1 | N |
| 2 | 1 | 2 | N |
| 3 | 2 | 3 | M |
| 4 | 5 | 4 | N |
| 5 | 7 | 5 | N |
| . | . | . | . |

| | JOB-ID<br>Topological<br>Map | | JOB-ID<br>Output<br>Map |
|---|---|---|---|
| 0 | 8 | 0 | N |
| 1 | 6 | 1 | N |
| 2 | 8 | 2 | N |
| 3 | 2 | 3 | M |
| 4 | 8 | 4 | N |
| 5 | 2 | 5 | M |
| . | . | . | . |

Thus, combined (OR'ed together), we have:

| | SALARY<br>Output<br>Map | | JOB-ID<br>Output<br>Map | | Query<br>Output<br>Map |
|---|---|---|---|---|---|
| 0 | N | 0 | N | 0 | N |
| 1 | N | 1 | N | 1 | N |
| 2 | N | 2 | N | 2 | N |
| 3 | M | 3 | M | 3 | M |
| 4 | N | 4 | N | 4 | N |
| 5 | N | 5 | M | 5 | M |
| . | . | . | . | . | . |

Thus, records 0, 1, 2, and 4 have been eliminated from consideration, and records 3 and 5 may or may not satisfy the query.

VARIATIONS AND OTHER APPLICATIONS

Representation of maps

The topological maps used in accordance with the invention may be represented in various manners. The standard representation is usually thought of as an array of codes, each code corresponding to an information element or record of the information base. Another possible representation is to have one bit-map per record, each bit corresponding to a given code. Another possibility is to have one bit-map per set of records, setting the bit corresponding to each code to which the attribute values in the set map. Still another possibility is to have a multi-level bit-map.

For example, with 64 codes, ordinarily, we would think that it is necessary to have a bit-map with 64 positions on it. However we can reduce this storage requirement to only 16 bits.

Construct two sets of bit-maps:

(1) Corresponds to the code / 8 (/ means integer division).

(2) Corresponds to the code % 8 (% means modulus division).

Thus, if we have a record which has an attribute value corresponding to code 28, we set two bits in the bit-maps corresponding to this record. We set the bit corresponding to (28 / 8) = =3 in map 1. We set the bit corresponding to (28 % 8) = =4 in map 2.

To get the bit-map corresponding to any code, e.g., code 35, we fetch the bit-map corresponding to (35 / 8) = =4 in map 1, and the bit-map corresponding to (35 % 8) = =3 in map 2. By ANDing these two maps together, we have a map indicating exactly those records which have an attribute which maps to code 35.

The same can be done for multiple records per bit, only in that case some uncertainty is present when regenerating the maps, i.e., the map recreated for code 35 would not necessarily contain only records which have an attribute which map to code 35. However, this error is statistically controllable.

These bit-maps are most advantageously stored bit-wise, i.e., the bit 0's of all the maps would be stored together, then all of the bit 1's, then all of the bit 2's, etc. Thus, when presented with a range query, simply retrieve all the maps corresponding to the desired range(s) and OR these together to form a map indicating all subsets of records which do not contain a record in the specified range(s).

Derived attributes

Not only is it possible to create and store maps for attributes which are stored directly in the information element, but it is also possible to store maps for attributes which are calculated from the fields in the information base. For example, if we have a database having personnel records containing both the individual's gross income and tax rate, then we may get any number of queries referring to net income, i.e., (gross income * tax rate). We can store in correspondence with the database, a map of net income, where each time the record is stored, the net income is calculated and then a map entry stored as with any attribute. Then, when a query is received referencing net income, this map may be used to isolate the records, without ever having to calculate any values.

The full scope of the term "derived" can be extended a little by the following example. If instead of having the tax rate stored directly in the record, let's say we store gross income and deductions. Based on gross income and deductions, a look-up in another database may be performed which results in determining the tax rate. We can store the net income map as described above, if when each record is stored, we look up the tax rate given the information in the record, and calculate net income and store a map entry. The point here is that "derived" does not necessarily mean straightforward computations. They can be values looked up in a database, or derived from an expert system for that matter.

Multiple records per representation

It is possible to extend the concept of the subset of records to encompass having more than one record as long as the logic utilized to manipulate the maps is consistent.

To consider an example, let's say we have a database containing multiple personnel records. We can choose to represent the range(s) to which a subset of records maps by a bit-map, this bit-map containing one bit for each range. Then, given a subset of records, we determine the ranges to which the values of the attribute of the individual records map. Then, we set the bits corresponding to these ranges.

When given a range query on this attribute, we can set up a bit-map containing a 1 in all bits which correspond to ranges that fall within or overlap with the query range. Then, each entry in the map is AND'ed with this mask, and if any non-zero bits are found in the result, then this subset may contain one or more records which meet the specification, otherwise, we have eliminated this subset with certainty. Graphically:

| Bit | 0 | 1 | 2 | 3 | 4 | 5 | 6 | 7 |
|-----|---|---|---|---|---|---|---|---|
| Age | 0 | 10 | 20 | 30 | 40 | 50 | 60 | 70 | 80 |

Thus, bit 0 will have a 1 in it if a record in the subset has a record with ($0 \leq Age < 10$), bit 1 will have a 1 in it if a record in the subset has a record with ($10 \leq Age < 20$), etc. For example, say we have two personnel records per subset, and a subset contains these two records.

Name: Bill
Age: 25
Salary: 35000

Name: Jim
Age: 32
Salary: 42000

Then, the attribute map representation for Age for this subset would be calculated as:

0—0—1—1—0—0—0—0

The calculation is:

| Bit | 0 | 1 | 2 | 3 | 4 | 5 | 6 | 7 |
|-----|---|---|---|---|---|---|---|---|
|     | 0 | 0 | 1 | 1 | 0 | 0 | 0 | 0 |
| Age | 0 | 10 | 20 | 30 | 40 | 50 | 60 | 70 | 80 |

Since Bill has (Age==25), ($20 \leq Age < 30$), which means set bit 2. Jim has (Age==32), ($30 \leq Age < 40$), which means set bit 3.

Please note that the number of records per subset for two maps could be different, and the maps may still be used together.

Data Analysis

The principles of the present invention can be readily applied to detect correlations in data among two or more variables. Given two or more variables, and maps for these variables, it is very straightforward to determine if there may be correlations among these variables. For example, let's say that we have two variables which apply to all records in a database, Age and Salary, and assume that Age and Salary are each partitioned into 50 ranges.

If we wish to determine if there is a correlation between Age and Salary, this can be done by creating a (50×50) array of integers. Initially, we set each position to 0. Then, we fetch the maps corresponding to Age and Salary. The codes for Age and Salary for each record together make up an ordered pair which can be used a reference to a specific element in the (50×50) array.

For each record, using the code for Age and the code for Salary, we create such an ordered pair, and then increment the corresponding array element by 1. This process is repeated for each record in the database.

At the end of this process, we have an array of counts. Statistically, since we know the number of records in each range for both Age and Salary (we can just count them to determine this), we can estimate the expected number of records in each "grid-point" (i.e., intersection of an Age range and Salary range) if the two variables are independent of one another. By comparing this number with the actual number of records counted, it may be determined if a statistically significant difference between the number of records expected to be observed and actually observed is present; this, of course, serves as the basis for stating that there is a correlation (or not) between these two variables.

There are two extensions to this process:

(1) Extend it to n variables from 2. I.e., we can have three variables if we set up a 3-d matrix.

(2) Examine only a subset of the total information base. E.g., we may never see a correlation in the above (between Age and Salary) until we limit the records for consideration to be from a single profession. Then, the correlation seen would be quite profound.

Thus, using our standard query techniques, we can narrow the sample down to a relevant subset of the records in the entire information base.

Implementation on a Microcomputer

From the foregoing illustrative example, and the description of the process and algorithm given therein, persons skilled in programming of digital computers will readily appreciate that the system and process of the present invention is capable of being implemented and utilized with computers of various types architectures and sizes, including microcomputers and mainframes, and using various programming languages and techniques. For example, a database storage and retrieval system utilizing the procedures described in the foregoing illustrative example has been implemented for the IBM-AT computer. In tests utilizing such a system for retrieving data records from a test file of approximately 15,000 records, 1.3 megabytes in size, this system demonstrated an ability to access and retrieve records at least 80 times faster than the most popular commercially available database system.

A microfiche appendix of the program listing of this computer program is included with this application in accordance with 37 CFR Section 1.96(b). It is to be understood that this listing is not intended as limiting, but rather is provided for purposes of further illustrating the broad applicability of the present invention and how the principles and methods of this invention, which are fully disclosed elsewhere in this application, may be implemented in a microcomputer environment.

Parallel Processing Techniques

All of the methods disclosed herein are easily done in parallel. This is due to the fact that this entire system is based on maps, which are fundamentally arrays of codes. The arrays are easily partitionable into mutually exclusive, independent segments, which may then be operated on in parallel.

For example, let's assume we want to make an AT-based system which runs 4 times as fast as a standard AT system. Connect 4 independent systems so that they may communicate over some network connection, as illustrated in FIG. 2. When a record is added, AT0 determines which record number should be used for this newly added record, rec-num. Now, take (rec-num MOD 4), which results in a number between 0 . . . 3. Now, let AT# take custody of this record, where #==(rec-num MOD 4). Thus, we in effect evenly distribute the records among the 4 ATs. Now, let's assume that we receive a query. AT0 can transmit the query to the other AT's on the network. Each AT will begin processing the query on its one-fourth of the information base, this processing going on in PARALLEL. Then, each AT can transmit its results (e.g., an array of matching record numbers) back to AT0, so the user sees an effective query processing time of one-fourth.

To take another example, consider the above Data Analysis example where we are trying to determine a correlation between Age and Salary. Given that we have distributed the maps as described above, this distribution analysis can be conducted in parallel on each of the four machines. The result of this analysis is a (50×50) array of integers. After each machine has finished computing the array for its section of the database, these arrays can be transmitted to AT0. AT0 can then add the (50×50) arrays resulting in one (50×50) array fully describing the distribution for the entire database. Thus, although the work per node is not quite divided by 4, for a large number of records it very nearly is.

Dedicated Architectures

A primary advantageous application of the present invention is to simplify data relational operations into straightforward manipulations which can easily be handled by a digital computer. However, further optimization can be obtained by designing specialized hardware to do these simple functions.

Often when processing a query, an array of integers, each integer corresponding to a range (an "acceptability table"), is used. For example, an array entry will be 3 if the corresponding range meets the query specification, 1 if the corresponding range may meet the query specification, and 0 if the corresponding range does not meet the query specification. The map for the attribute is then retrieved, and each entry in the map is processed in turn, causing a look-up into the array of integers, and if the entry in the array of integers is 0, then this record is eliminated from consideration, by writing a 0 in the position in the "acceptability map" corresponding to this record. It is straightforward to build a specialized chip which performs only this specific action. The "acceptability table" could be loaded directly on the chip at the start of the operation, a count of number of entries in the map to process as well as two vectors: one to the map for the attribute, the other to the "acceptability map". Then, the chip could begin processing, the processing rate greatly improved because:

(1) No bus bandwidth would be utilized with instruction fetches. Hand in hand with this is the fact that no execution time is spent decoding instructions. The logic is hard-coded in the operation of the chip.

(2) No bus bandwidth is utilized to "acceptability table" look-up, since this table is loaded directly on the chip.

In effect, the chip can be processing one record per two bus cycles.

To extend this a bit further, the dividing line between software and hardware is very arbitrary. In general due to cost considerations, only very general pieces of logic are implemented in hardware and then levels of software are used to build functionality using that hardware base. In the case of the present invention, this hardware synthesis can be expected to be particularly advantageous, as the basic operations are straightforward and are generally applicable to all applications of the present invention.

That which we claim is:

1. A system for storing and manipulating information in an information base, said system comprising
    (a) an information storage device;
    (b) a plurality of information elements stored in said storage device, each information element having at least one attribute with an orderable value, and
    (c) a topological map stored in said storage device for each said attribute, said map comprising
        (1) means for representing a predetermined number of ranges of attribute values, which ranges collectively include the attribute values for all information elements in the information base; and
        (2) means defining a correspondence between each of said information elements and the ranges to which they map.

2. A system as defined in claim 1 additionally including
    (d) an input device cooperating with said information storage device for receiving a query having specifications based upon specified parameters related to an attribute of the stored information elements; and
    (e) means responsive to receipt of a query for accessing said topological map based upon said query and for identifying from said map, without inspection of the information elements, information elements in the information base which are known to meet the specifications of the query.

3. A system as defined in claim 2 wherein said means (e) also includes means for identifying from said map, without inspection of the information elements, information elements in the information base which are known not to meet the specifications of the query.

4. A system as defined in claim 2 wherein said means (e) also includes means for identifying from said map, without inspection of the information elements, information elements in the information base which may meet the specifications of the query.

5. A system as defined in claim 4 including means for inspecting only those elements of the information base which may meet the specifications of the query and for identifying which of those elements do meet the specifications of the query, whereby all of the information elements of the information base which meet the specifications of the query are identified.

6. A system as defined in claim 1 additionally including
    (d) an input device cooperating with said information storage device for receiving a query having specifications based upon specified parameters related to an attribute of the stored information elements; and
    (e) means responsive to receipt of a query for accessing said topological map based upon said query and for generating therefrom an output map having elements which correspond to each of the information elements in the information base and which indicate whether each respective information element does, does not or may meet the specifications of the query.

7. A system defined in claim 6 additionally including (f) means for inspecting only those information elements of the information base which were indicated in said output map that they may meet the specifications of the query and for identifying which of those elements do meet the specifications of the query, whereby all of the information elements of the information base which meet the specifications of the query are identified.

8. A system as defined in claim 1 wherein the information elements stored in said storage device each have a plurality of different attributes, and wherein said system additionally includes (d) an input device cooperating with said information storage device for receiving a query having specifications based upon Boolean logic related to a plurality of the attributes of the stored information elements and to specified parameters related to the attributes;

(e) means responsive to receipt of a query for accessing the topological maps for each attribute specified by said query and for generating therefrom, for each specified attribute, an intermediate output map having elements which correspond to each of the information elements in the information base and which indicate whether each respective information element does, does not or may meet the specifications of the attribute specified in the query; and (f) means for combining the respective intermediate output maps in accordance with the Boolean logic of the query to produce an output map having elements which correspond to each of the information elements in the information base and which indicate whether each respective information element does, does not or may meet the specifications of the query.

9. A system defined in claim 8 additionally including (g) means for inspecting only those information elements of the information base which were indicated in said output map that they may meet the specifications of the query and for identifying which of those elements do meet the specifications of the query, whereby all of the information elements of the information base which meet the specifications of the query are identified.

10. A system as defined in claim 1 wherein said means for representing a predetermined number of ranges comprises a plurality of codes having distinct and unique values, and wherein said means defining a correspondence between each of said elements and the ranges to which they map comprises a series of said codes, equal in number to the number of information elements in the information base, with each code in the series corresponding to a respective one of said information elements, and with the values of the respective codes of said series defining a correspondence between the respective information element and the range to which the attribute value of that element maps.

11. A system as defined in claim 10 wherein each said topological map is represented by an array of said codes.

12. A system as defined in claim 10 wherein each said topological map is represented by a bit-map, each bit-map corresponding to a given code.

13. A system as defined in claim 12 wherein the bit-map comprises a multi-level bit-map.

14. A system for storing and manipulating data records in a computer data base, said system comprising (a) a data storage device;

(b) a plurality of data records stored in said storage device, each data record consisting of multiple fields of data, with each field having an orderable value;

(c) a topological map for each of said fields, each said topological map being stored in said storage device and including (1) a plurality of range codes having distinct and unique values representing a predetermined number of ranges of values for said field, with the ranges collectively including the field values for all of the records in the data base; and (2) an array of elements, equal in number to the number of data records in the data base, with each element in the array corresponding to a respective one of said records in the data base, and with each element possessing a range code to define a correspondence between each record and the field value to which the range code maps.

15. A system as defined in claim 14 including (d) an input device cooperating with said data storage device for receiving a query having specifications based upon specified parameters and logic related to one or more fields of the stored data records;

(e) means responsive to receipt of a query for selecting the stored topological maps for the field or fields specified in the query and for selecting relational operations corresponding to the logic specified in the query; and (f) means for performing the selected relational operations employing the selected topological maps to identify a superset of data records in the data base in which is included all records of the data base which meet the specifications of the query.

16. A system as defined in claim 15 wherein said data storage device includes high speed random access memory into which said topological maps are loaded when performing the selected relational operations to identify said superset of data records.

17. A system as defined in claim 15 wherein said data storage device comprises a plurality of computer systems interconnected to communicate with one another, the information elements of the information base being distributed among said computer systems and said systems operating in parallel to identify said superset of records.

18. A system as defined in claim 14 including means defining a correction map for storing the range codes for every attribute for information elements added to the information base after creation of said topological map.

19. A method for generalized topological mapping of an information base composed of a plurality of elements, each element having at least one relatable attribute with an orderable value, comprising (a) selecting an attribute of the elements;

(b) for the selected attribute, defining a predetermined number of ranges of attribute values, which ranges collectively include the selected attribute values for all elements in the information base; and (c) for the selected attribute, storing in a information storage device a topological map defining a correspondence between said elements and the ranges to which they map.

20. A method according to claim 19 wherein each element of the information base comprises a plurality of relatable attributes, each with an orderable value, and said method includes repeating steps (a), (b) and (c) to produce stored topological maps for each of said plurality of relatable attributes.

21. A method according to claim 19 or 20 wherein the respective elements of the information base comprise records.

22. A method according to claim 19 or 20 wherein the respective elements of the information base comprise groups of records.

23. A method for controlled topological manipulation of an information base composed of a plurality of elements, each element having at least one relatable attribute with an orderable value, in response to a query having specifications based upon specified parameters and logic related to at least one attribute of the elements, said method comprising
 (a) selecting an attribute of the elements;
 (b) for the selected attribute, defining a predetermined number of ranges of attribute values, which ranges collectively include the selected attribute values for all elements in the information base;
 (c) for the selected attribute, storing a topological map defining a correspondence between said elements and the ranges to which they map;
 (d) selecting the appropriate topological maps produced in accordance with step (c) for the attribute or attributes specified in the query,
 (e) selecting relational operations corresponding to the logic specified in the query, and
 (f) performing the selected relational operations employing the selected topological maps to define a superset of elements in the information base in which is included all elements of the information base meeting the specifications of the query.

24. A method according to claim 23 wherein the query is based upon specified parameters and logic related to a plurality of attributes of the elements, and a plurality of topological maps related to such attributes are selected in step (d), and wherein said step (f) comprises combining the plurality of selected topological maps in accordance with the selected relational operations to produce said superset.

25. A method for storing and manipulating information in an information base comprising
 (a) storing in an information storage device a plurality of information elements, each element having a plurality of attributes with an orderable value,
 (b) for each said attribute of the elements,
  (1) defining a predetermined number of ranges of attribute values, which ranges collectively include the attribute values for all elements in the information base, and
  (2) storing in the information storage device a topological map defining a correspondence between said elements and the ranges to which they map, whereby a stored topological map is produced for each of said plurality of attributes;
 (c) receiving a query having specifications based upon specified parameters and logic related to one or more attributes of the stored elements;
 (d) selecting the stored topological maps for the attribute or attributes specified in the query;
 (e) selecting relational operations corresponding to the logic specified in the query;
 (f) performing the selected relational operations employing the selected topological maps to define a superset of elements in the information base in which is included all elements of the information base meeting the specifications of the query; and
 (g) utilizing said superset to selectively access the stored elements of the information base.

26. A method for storing and manipulating information in an information base comprising
 (a) storing in an information storage device a plurality of information elements, each element having a plurality of attributes with an orderable value,
 (b) also storing in the information storage device, for each said attribute of the elements, a topological map which includes a plurality of range codes representing a predetermined number of ranges of attribute value, which ranges collectively include the attribute values for all information elements in the information base, and an array of said range codes which defines a correspondence between each of said information elements and the ranges to which they map;
 (c) receiving a query having specifications upon specified parameters and logic related to one or more attributes of the stored information elements;
 (d) accessing the topological maps for each attribute specified in the query and generating therefrom an output map having elements which correspond to each of the information elements in the information base and which indicate whether each respective information element does, does not, or may meet the specifications of the query.

27. A method as defined in claim 26 including the steps of
 adding additional information elements to the information base,
 creating a correction map containing, for each such added elements, the range codes for every attribute of the added information element, and
 each time a topological map is accessed in accordance with step (d), processing the correction map to update the topological map.

28. A method as defined in claim 26 wherein the query is based upon Boolean logic related to a plurality of the attributes of the stored information element and to specified parameters related to the attributes, and
 wherein said step of accessing the topological maps and generating an output map comprises
  (1) accessing the topological map for each attribute specified in said query and generating therefrom, for each specified attribute, an intermediate output map having elements which correspond to each of the information elements in the information base and which indicate whether each respective information element does, does not, or may meet the specifications of the respective attributes specified in the query;
  (2) combining the intermediate output maps in accordance with the Boolean logic of the query to produce said output map.

* * * * *

UNITED STATES PATENT AND TRADEMARK OFFICE
CERTIFICATE OF CORRECTION

PATENT NO.  : 4,811,199

DATED       : March 7, 1989

INVENTOR(S) : William L. Kuechler, et al.

It is certified that error appears in the above-identified patent and that said Letters Patent is hereby corrected as shown below:

Column 13, line 11, insert -- ACCEPTABLE[TOPOLOGICAL-MAP[i]]. -- after "(1) OUTPUT-MAP[i]:=".

Column 25, line 49, delete "said".

Signed and Sealed this

Seventeenth Day of October, 1989

Attest:

DONALD J. QUIGG

Attesting Officer

Commissioner of Patents and Trademarks